United States Patent [19]

Lofgren et al.

[11] 4,069,774

[45] Jan. 24, 1978

[54] DIGGING AND PLANTING MACHINE HAVING PLURAL SURFACE DETECTING AND SIGNALLING MEANS

[75] Inventors: Stig-Gunnar Lofgren; Bo Gunnar Ekeborg, both of Jarved, Sweden

[73] Assignee: Mo och Domsjo Aktiebolag, Ornskoldsvik, Sweden

[21] Appl. No.: 697,097

[22] Filed: June 17, 1976

[30] Foreign Application Priority Data

June 27, 1975 Sweden .............................. 7507379

[51] Int. Cl.$^2$ ................................................ A01C 11/00
[52] U.S. Cl. .................... 111/3; 37/DIG. 20; 111/89; 172/4; 173/20; 175/40; 408/14
[58] Field of Search ............... 175/40; 173/20, 21; 408/14; 200/16 R; 111/2, 3, 89; 172/4, 4.5; 37/DIG. 20; 56/208

[56] References Cited

U.S. PATENT DOCUMENTS

| 181,065 | 8/1876 | Goodwin | 111/4 |
|---|---|---|---|
| 577,539 | 2/1897 | Speidel | 111/2 |
| 2,223,559 | 12/1940 | Fleming | 111/3 |
| 2,473,655 | 6/1949 | Lohn | 56/208 |
| 2,909,082 | 10/1959 | Booth | 408/14 X |
| 3,258,549 | 6/1966 | Stol | 200/16 R |
| 3,491,624 | 1/1970 | Poincenot | 408/14 |
| 3,770,065 | 11/1973 | Gill et al. | 172/4.5 |
| 3,899,985 | 8/1975 | Rath | 111/3 |
| 3,931,774 | 1/1976 | Bradley | 111/3 |
| 3,972,294 | 8/1976 | Grundstrom et al. | 111/3 |

FOREIGN PATENT DOCUMENTS

| 745,304 | 5/1933 | France | 111/3 |
|---|---|---|---|
| 2,455,759 | 6/1975 | Germany | 111/3 |
| 2,351,775 | 5/1974 | Germany | 111/2 |
| 127,087 | 7/1959 | U.S.S.R. | 172/4 |

*Primary Examiner*—Clifford D. Crowder
*Assistant Examiner*—Steven A. Bratlie

[57] ABSTRACT

A digging and planting machine is provided having a tubular digging and planting tool, and at least two surface-detecting and signalling means for sensing the surface of the ground adjacent the digging tip of the tool, preferably on opposed sides of the digging tip, thus gauging the lay of the surface, so as to ensure that the digging tip provides and a plant is fed to a planting hole of the desired depth.

17 Claims, 4 Drawing Figures

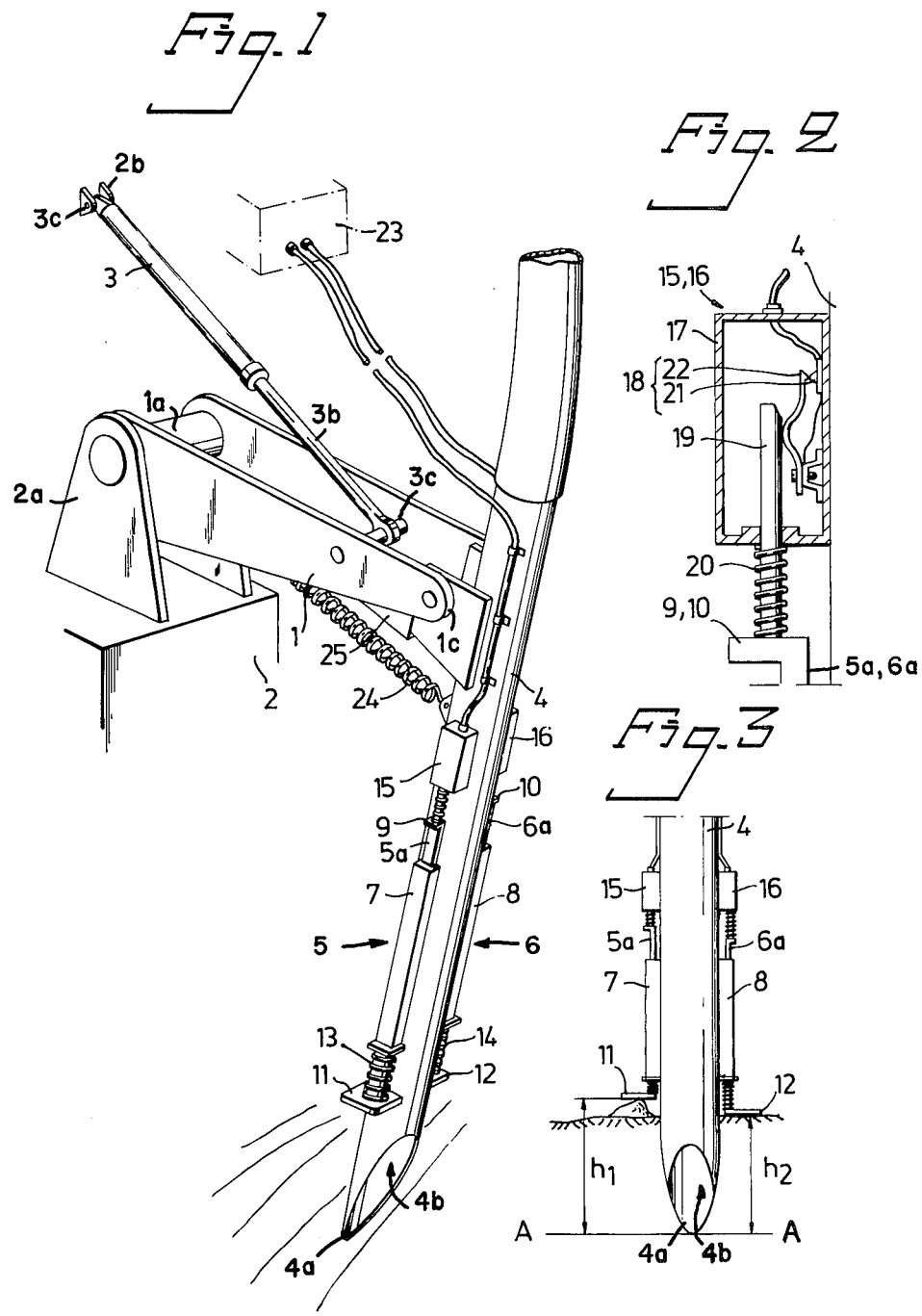

DIGGING AND PLANTING MACHINE HAVING PLURAL SURFACE DETECTING AND SIGNALLING MEANS

Planting machines are now widely used in reforestation of cut or burned over or otherwise barren forest land. Frequently, however, the machines fail to set the plants in deeply enough, and as a result the plants do not grow well and may die. This problem is due to the presence of obstacles in the ground, such as stones, stubs, large roots and the like, which prevent the digging devices of the planter from penetrating deeply enough into the ground.

There are two main types of reforestation or planting machines: those provided with tubular hole-making devices, and those provided with tubular plowing devices, which dig a furrow that has the hole at a deep end or portion thereof. Both of these devices operate intermittently. The tubular plowing device has a number of serious disadvantages. Such devices take longer to plow a hole and plant a plant than the short time from 2 to 4 seconds allotted for each single planting operation, due to the fact that the feed-out end of the planting tool is either substantially planar or slightly V-shaped. Consequently, the planting means, despite its simultaneous forward movement, encounters a high degree of resistance when moved moved into the ground.

To ensure that each plant is set to a proper depth, it is necessary to measure accurately the depth of the hole in which the plant is to be set, and transfer the plants from the machine to a hole only when the hole is deep enough. Devices for measuring or sensing the depth of a hole in which a plant is to be set are normally constructed so that the digging tool itself measures the depth of the hole, with the surface of the ground as a reference surface for a slide shoe or the like connected with said digging tool, and moved along said surface of the ground. However, such a device can give a signal for transferring a plant from the planting apparatus to the intended hole when the hole is too shallow, if the slide shoe becomes positioned at a higher level than the ground, on a raised stone or some other obstacle at the same time as the digging tool digs into the ground. In such a case the vertical distance between the upper surface of the obstacle and the point of the digging tool is the sum of the elevation of the object above the ground and the resulting depth of the hole, and the correct depth is signaled when the hole is too shallow.

The planting device upon being moved into the ground also may rest on a branch or the like extending in the direction of movement by the planting machine, when the planting apparatus is preceded along its forward movement path by a ground-preparing scarifying wheel or the like. Branches picked up by the wheel are moved to beneath the planting device, thereby delaying the insertion of said device into the ground, so that a plant is either fed from the planting machine too early, or not at all.

Another disadvantage of tubular plowing devices is that, even when the devices are arranged to be inserted into the ground with an oblique, downward movement, the earth tends to penetrate the plant exit opening of the planting device, and makes feeding of the plants through the opening difficult. The reason why earth penetrates the planting tube is that the downwardly facing opening of the tubular planting device is either substantially horizontal or is inclined to the surface of the ground at an angle which is smaller than the angle formed between the movement path of the planting device and the surface of the ground.

In accordance with Ser. No. 526,278 filed Nov. 22, 1974, now U.S. Pat. No. 3,998,171 patented Dec. 21, 1976, to Lofgren and Moberg, a pneumatic depth indicator is provided on the digging tool. The planting machine of that invention comprises, in combination, a digging tool; a vehicle carrying the digging tool; and a depth indicator in operative association with the digging tool, signalling when the digging tool has reached a predetermined depth for a plant to be transferred from the machine, the depth indicator comprising at least one gas conduit for conveying a gas under superatmospheric pressure from one end to the other end thereof, the one end being adapted to be connected to a gas supply, the other end being open to the atmosphere and spaced a vertically projected distance from the tip of the digging tool equal to the depth of the hole dug by the tool for a plant, and so arranged that the opening to atmosphere is plunged into blocking contact to the earth when the predetermined hole depth is reached, thereby halting flow of gas from the conduit.

A further problem with some types of tubular plowing devices having an open digging tip end is, that a plant cannot be placed in the tube until the planting site has been selected by the operator, and the tube is located over it. Since many suitable planting sites are not greater than about 0.5 to 1 $m^2$ in area, at excessive vehicle speeds the planting tube is liable to pass the planting site, or to be located over a place where the depth of earth is not favorable, before the plant can be delivered from the tube. To reduce this risk, it has been necessary to drive the machine at a relatively low forward speed, which greatly reduces the planting capability of the machine.

Another problem is that the open tip end of the tool can strike hard against stones and other obstacles in the ground, resulting eventually in a sufficient deformation of the tip end to render it unserviceable. This has limited the speed at which the planting tool can be inserted into the ground.

In accordance with Ser. No. 601,557, filed Aug. 4, 1975, issuing to Lofgren, a planting machine is provided which reduces the distance through which a plant must travel at the actual moment of planting, and increases the speed at which the digging and planting tube can dig a hole and plant a plant without danger of obstruction. The digging and planting machine according to that invention comprises at least one tubular digging and planting tool, movable between ground-contacting and ground-elevated positions, and having an open digging and planting tip end; closure means movable between a first position closing off the open end for digging a hole and a second position exposing the open end for delivery of a plant from the planting tool into the hole; and means for compacting earth around the plant after planting.

The closure means makes it possible to retain a plant in the tool at the exit opening while a hole is being dug by the tool, so that a plant can be held in a position of readiness, adjacent the exit opening, for delivery to the hole as soon as it is dug. Because of the relatively short path through which the plant has to move when discharged from the tool, the machine can be advanced at a relatively high speed, without risk of the plant landing outside the planting site when the closure is opened, and it is discharged from the tube.

Furthermore, since the exit opening of the tube is closed while the tip is digging a hole, earth, stones wood and other objects cannot enter the tube, and obstruct delivery of the plant to the hole.

A further problem arises from variations in the lay of the land. The surface of the ground is normally uneven, with hollows and mounds or upstanding stones and the like, all within the span of the wheels and the wheelbase of the vehicle. This means that if the height of the vehicle above the ground constitutes a reference level for hole-digging operations, the plants may be planted at a depth which is either too shallow or too deep.

Consequently, it has been suggested that either before or at the same time as the planting device is inserted into the ground a separate sensing device establish the lay of the ground at the planting site, in relation to the vehicle and the digging tool. Then, the subsequent digging operations can be determined, and the planting device actuated accordingly. This poses a new difficulty, since the sensing device may encounter a stone, a thick branch, or some other obstacle which projects out of the ground, thereby erroneously indicating the upper surface of the obstacle as the surface of the ground. As a result the subsequent digging operations are premature so that the plant is planted at a depth which is too shallow.

The present invention overcomes this difficulty by providing a hole-making or furrow-making, elevatable planting device, and at least two ground surface-detecting and signalling devices adjacent and preferably on opposed sides of the planting device, which are mounted for vertical movement into and away from contact with the surface of the ground or obstacles thereon. The surface-detecting and signalling devices are interconnected so that at least two devices must be in contact with the ground or obstacles thereon, so as to ascertain the lay of the ground prior to or during the insertion of the planting device thereinto.

Since the apparatus is provided with surface-detecting means, premature or late digging due to the presence of obstacles projecting from the surface of the ground and hollows therein when using the level of the vehicle as a reference level is prevented. A plurality of such ground surface-detecting devices preferably on opposed sides of the digging and planting tool, which must co-act for digging and planting, detect the surface on each side, and reduce the risk of errors, inasmuch as the probability that each of a plurality of ground-sensing devices will detect an obstacle on the ground at the same time if the digging and planting tool is not impeded by the obstacle is relatively small, and considerably smaller than in the case where only one ground-detecting device is provided.

The planting machine in accordance with the invention comprises, in combination, a vehicle, and, carried on the vehicle, a tubular digging and planting tool having an open digging and planting tip end, for digging a hole and conveying a plant to the hole; means for moving the digging and planting tool between ground-elevated and ground-contacting positions; and at least two surface-detecting and signalling means for sensing the surface of the ground, including obstacles thereon, adjacent to and preferably on opposed sides of the digging tip end of the tool; thereby gauging the lay of the surface of the ground between the surface-detecting means, and facilitating operation of the tool to provide a hole of the desired depth.

In a preferred embodiment, the machine also includes means for compacting earth about the plant after it has been deposited in the hole; and means for moving the digging and planting tool and the compacting means separately and together between ground-elevated and ground-contacting positions.

In a further preferred embodiment, the open tip end of the digging and planting tool comprises closure means movable between a first position closing off the open end for digging a hole, and a second position exposing the open end for delivery of a plant from the planting tool into the hole. Suitable closure means is described in Ser. No. 601,557, the disclosure of which is hereby incorporated by reference.

The means for moving the closure means between end-open and end-closed positions, such as a piston and hydraulic cylinder, can be arranged at the same time to reciprocate the digging and planting tool alone or together with the compacting means, between ground-elevated and ground-contacting positions, and vice versa.

The term "surface of the ground" is used herein generically to include whatever is on the surface or constitutes the surface, not only the earth, but also stones or rocks and like obstacles to digging, on or in the ground.

Preferred embodiments of the planting machine of the invention are shown in the drawings, in which:

FIG. 1 is a perspective view of a planting machine according to the invention, provided with two surface-detecting and signalling devices, for detecting the surface of the ground or obstacles thereon, preferably on opposed sides adjacent the digging tool, and shown in the first operation stage;

FIG. 2 is a cross-sectional detailed view on an enlarged scale of a signalling device shown in FIG. 1;

FIG. 3 is a side view from the rear of the planting machine of FIG. 1, in a second operating stage, with the digging tool inserted into the ground to the intended depth.

Figure 4:
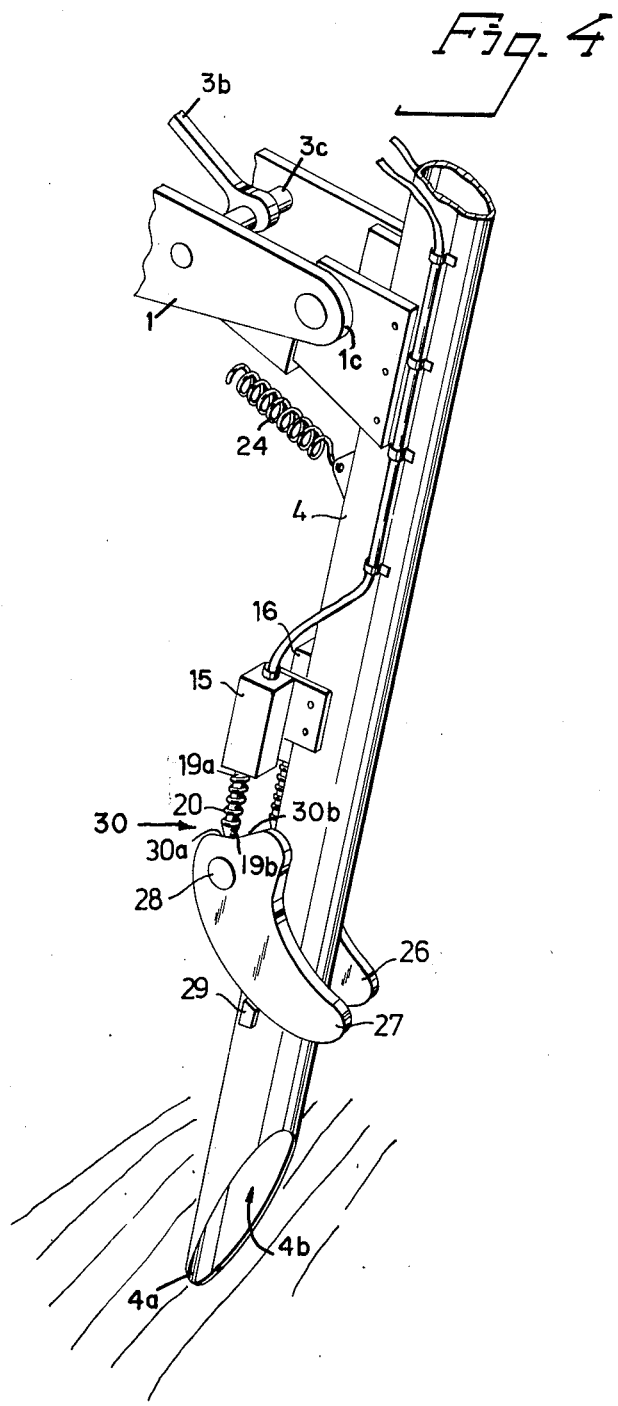
FIG. 4 shows another embodiment of the planting machine according to the invention.

The planting machine shown in FIG. 1 has a lifting arm 1 which is pivotably mounted on pin 1a at one end for up and down movement. The pin 1a is held in frame 2a on the vehicle 2. Pivoting movement of the lifting arm is effected by hydraulic cylinder 3, pivotably carried on pin 3c, which is attached by frame 2b to the vehicle 2. The piston 3b is pivotably mounted on pin 3c which is fixed to the lifting arm 1. The lifting arm carries on its free end 1c the digging and planting tool 4 which is of tubular construction and terminates in the digging tip 4a with a rearwardly facing opening 4b. The tip 4a is inserted into the ground by the lifting arm, in order to make a planting hole or furrow in the ground.

Disposed between the lifting arm 1 and the digging and planting tool 4 is a tension spring 24 which attempts to pivot the tool 4 into an oblique position facing both forward and down in which it engages a stop 25 on the lifting arm, as shown in FIG. 1. The tool 4 receives plants from a plant storage supply on the vehicle 2, from which plants can be supplied to the planting holes or furrows via the planting tool 4.

To make it possible to detect the surface of the ground at either side of the tool 4 at the selected planting sites, two surface-detecting and signalling devices 5,6 are reciprocably mounted on each side of the planting tool 4 in fixed guides 7,8. Each device 5,6 includes a rod 5a, 6a which is provided at its upper end with a land 9, 10 and at its lower end with an abutment plate 11, 12. Mounted between each abutment plate 11, 12 and guide 7, 8 is a compression spring 13, 14. The springs 13, 14 urge the surface-detecting and signalling devices 5, 6 towards their lower limiting position (see FIG. 1) on the planting tool 4, in which position each of the lands 9, 10 lies against the top end of its corresponding guide, which serves as a stop.

A signalling device 15, 16 is fixedly mounted on the planting tool 4 above devices 5, 6. Each signalling device comprises a casing 17, an electric switch 18, and an actuating rod 19 which is reciprocated in casing 17 into and out from engagement with a resilient switch 22 by the rods 5a, 6a; see FIG. 2.

A compression spring 20 is mounted between the lower surface of the casing 17 and the land 9, 10 on the upper end of the rods 5a, 6a. The contact switch 22 moves out from and into electrical contact with a fixed contact strip 21 which is electrically connected to a unit 23 provided with a time relay for automatically controlling the intervals at which a plant is discharged from tool 4 and at which the hydraulic cylinder 3 is actuated; the unit 23 is shown schematically in FIG. 1.

Normally, the resilient contact strip 22 is away from contact with contact 21, and the electric circuit is open. Operation of the switch follows movement of the rods 19 by the sensing rods 5a, 6a; when the rods 19 reach contact 22, they press the contact strips 21, 22 together and close the circuit. The connection of the switches to the control unit is such that to close the electric circuit both switches 18 must be closed.

Operation of the planting machine is as follows:

While the vehicle 2 such as a tractor supporting the planting apparatus is moved continuously over the planting area, the tractor driver examines the ground for suitable planting sites. While the driver is making his examination, the planting device is held lifted from the ground by means of the lifting arm 1 and the hydraulic cylinder 3, the digging and planting tool 4 being drawn forward by the spring 24 into abutment with the stop 25. When the planting tool 4 is located above a suitable planting site, the driver actuates the hydraulic cylinder 3 so as to extend the piston 3b, whereupon the planting tool is rapidly moved down, and the tip 4a plowed into the ground. When the tip 4a has penetrated the ground to approximately ⅓ of the desired planting depth, the abutment plates 11, 12 on the two surface-detecting devices 5, 6 come into contact with the ground surface. Upon further insertion of the tip 4b into the ground, the plates 11, 12 rest on the ground surface and rods 5a, 6a, are moved upwardly against the force of the springs 13, 14. In this way, the rods 5, 6 move the spring-biased impact rods 19 in the casing 17 upwardly until they are in engagement with respective contact strips 22, and press said strips against the contact strips 21, so that the electric circuit in the control unit 23 is closed. Thereupon, the control unit sends an electric signal to control means (not shown) which are connected to the hydraulic cylinder 3 and to the plant supply. Such means may have the form, for example, of hydraulic or pneumatic magnetic solenoid valves. A plant is immediately discharged from the plant supply, and falls into the planting hole or furrow via the planting tube 4 at the same time as the hydraulic cylinder is released.

At this stage of the working operation, the digging tool has penetrated the predetermined distance into the ground, and, as a result of the forward movement of the vehicle, is pivoted in an oblique rearward/downward direction against the force of spring 24, without being removed from the planting hole or furrow. After planting the plant, the ground around the plant is compacted by means of an earth compacting device (not shown) carried on the vehicle, and then the planting device and the compacting device are withdrawn from the ground by means of the lifting arm and the hydraulic cylinder. Compacting of the ground and withdrawal of the mounting device and the compacting device are also effected upon the receipt of a signal from the control unit 23.

Should one of the abutment plates 11, 12 engage a large stone, branch or some other obstacle above normal ground level (see FIG. 3) upon insertion of the digging tip 4b into the ground, the impact rod 19 is moved up in its casing 17, and closes the switch 18 before the planting device has penetrated the ground to the intended planting depth. However, the other surface-detecting device has not reached the ground, and thus the control unit 23 is not actuated, since in order to actuate the control unit it is necessary for both switches to be in the closed position at the same time. Insertion of the planting device into the ground therefore continues until the second surface-detecting device reaches the ground surface and is displaced upwardly, and its impact rod 19 has closed the other switch 18.

Although it is possible that both ground-detecting means can be located above a stone while the digging tip between them can be inserted into the ground, the probability of this happening is relatively small, despite the relatively large number of stones and similar impenetrable obstacles normally found on wooden land. More commonly what occurs is illustrated in FIG. 3, i.e. one of the ground-detecting means encounters a stone, while the other contacts clear ground, and is displaced upwardly with the ground acting as an anvil surface. At the moment when both sensing means have been moved upwardly, have actuated their respective switches, and have closed their electric circuits, the digging tip has penetrated the ground to the desired depth, which is illustrated in the FIG. 3 by line A—A. The depth to which the tip has penetrated is correctly indicated by detecting means 6 as the distance designated $h_2$, while the other detecting means 5 has wrongly given the distance $h_1$ between the upper surface of an obstacle of the ground and the line A—A as the penetration depth. Because of the required interdependent combined actuation of both switches, only when the correct penetration depth is reached, sensed by the detecting means 6, does the control unit discharge a plant from the plant supply, and release the hydraulic cylinder.

Should the ground slope transversely of the vehicle, the lowest reaching detecting means controls the planting operation. In this way, the plants are planted sufficiently deeply in ground which slopes away steeply. Likewise, when one detecting means is located over a relatively narrow hollow, the bottom of the hollow is indicated as the level of the ground. So that the plant is at a sufficient depth even if the digging tip is inserted into a hollow.

Experience with the planting machine of the invention has shown a marked reduction in the number of plants planted at an insufficient depth in the ground, as a result of wrongly sensing the true location of the surface thereof.

While the device shown has two detecting means, located on each side of the digging and planting tool, along a line passing through the longitudinal axis of the tool, three, four and more detecting means can be used. The several means are best arranged symmetrically about the digging tip, so as to detect the surface of the ground surrounding the tip. If only two means are used, they are best arranged on opposed sides, and follow paths parallel to the path of the tip in the direction of movement of the vehicle. If three means are used, one can follow the path of the tip, directly ahead of the tip, or just to one side and ahead of the tip. Four means can be located at four points ahead and beside the tip. Normally, no sensing means is more than slightly behind the tip, since it will give a false reading if it encounters earth displaced by the tip during digging. The means thus are arranged laterally and ahead of the tip, out of the path of the earth displaced by the tip during digging. Of course, the more detecting means provided, the lower the risk that all will be located above an obstacle while the digging tip can pass unimpeded into the ground to the desired depth.

Neither is it necessary that the detecting means be movable in a straight line as shown in the illustrated embodiment. The detecting means may be pivotably arranged for movement in a vertical direction. Such an embodiment is shown in FIG. 4, which has two such detecting means 26, 27 instead of the devices 15, 16 of the previously described type. The detecting means 26, 27 are pivotably mounted on pivot pins 28 on opposed sides of the planting device 4. A torsion spring (not shown) is mounted between the pivot pins and detecting means and biases the detecting means down into abutment with a stop 29 fixed on the planting device. Each detecting means 26, 27 is provided at its upper end with a curved cam 30, against which the spring 20 biases the impact rod 19a of the signalling device. In this embodiment the lower end of the impact rod 19a is conveniently rounded at 19b. A wheel may be freely rotably mounted on the lower end of the detecting means, although such a wheel is not necessary.

When the digging and planting tool is held lifted above the surface of the ground, the two detecting means are urged against the stops 29 by the torsion springs, while the impact rods of the measuring devices rest against a low-profile surface 30a on the curved cam 30. When the digging tool is inserted into the ground, the detecting means engage the surface of the ground or an upstanding obstacle thereon, and are rotated upwardly against the force of the torsion spring, with the surface of the ground or the obstacle as an anvil. The curved cams 30 are thus rotated so that the impact rods 19a ride up along a curved surface 30b of high profile, and are reciprocated into the signalling devices 15, 16. Insertion of the digging tip into the ground is terminated in a similar manner to that described in the embodiment of FIGS. 1 to 3, i.e., at the moment when the switches of the two signalling devices are closed by the impact rods.

In a still further modification of the planting machine, the detecting means may be mounted on a frame structure which is secured to the vehicle or the lifting arm, and which is arranged adjacent the digging and planting tool, but spaced therefrom.

Neither need the signalling devices be of the type described in the illustrated embodiment; they can be of any suitable form. As will readily be understood, it is also possible to arrange the signalling devices and the control unit such that actuation of the digging and planting operations via said control unit are effected when the electric circuits are open, instead of closed.

The control means for initiating the digging and planting operations can be varied within the scope of the invention and can comprise mechanical devices as well as electrical.

As will be evident, although the planting machine shown in the Figures is not provided with earth compacting means, such compacting may be provided, mounted on the vehicle, or the lifting arm, or the digging and planting tool. The earth-compacting means can be arranged to be operated by the control unit, upon the receipt of a signal from the signalling means, as can also the digging and planting tool, the plant discharging means and any other means mounted on the vehicle and cooperating in the planting operation.

In a further embodiment of the arrangement, a reciprocable detecting means can be connected to a separate hydraulic cylinder, and be used as an earth compacting means.

The digging and planting tool and the compacting means need not be pivotably mounted on a lifting arm, as shown. They can equally well be arranged on an arm which can be folded in the direction of movement of the vehicle, or a telescopic arm can be provided, so that when the arm is extended, the digging and planting tool and compacting means are held at the hole during the planting operation. It is also possible to pivotably mount the digging and planting tool and compacting means on the vehicle by means of a folding scissors-linked extension arm which at one end thereof supports the digging and planting tool and compacting means, and at the other end thereof is pivotably mounted on the vehicle, so that the digging and planting tool retains its vertical orientation during each pivoting movement.

The digging and planting tool can also be pivotable in the horizontal plane, in addition to pivotable movement in the vertical plane, as shown in the drawings, for example, by causing the lifting arm to be pivotable both in the vertical and in the horizontal planes. In this way, it is possible to adjust the downward pressure exerted by the digging and planting tool in the presence of obstacles in the ground, and to permit the digging and planting tool to move to one side, as a result of pressures applied by obstacles in the ground.

The digging and planting tool and the compacting means can be curved. Such an embodiment provides a certain degree of freedom in construction of the apparatus and the base vehicle. The transport distance from the plant supply to the supply tube 4 can be shortened in this arrangement.

A flap over the opening 4b of the tip 4a makes it possible to retain a plant in the tool at the exit opening while a hole is being dug by the tool, so that a plant can be held in a position of readiness, adjacent the exit opening, for delivery to the hole as soon as it is dug. Because of the relatively short path through which the plant has to move when discharged from the tool, the machine can be advanced at a relatively high speed, without risk of the plant landing outside the planting site when the closure is opened, and it is discharged from the tube. p Furthermore, since the exit opening of the tube is closed while the tip is digging a hole, earth, stones, wood and other objects cannot enter the tube, and obstruct delivery of the plant to the hole.

In one advantageous embodiment of the invention, the closure means is in the form of a movable plate, arranged so that when in the closed position, the plate extends beyond the tip of the planting tool, and protects the point during when the digging or while in contact with the ground. In this way, the tip end of the tube is prevented from striking against stones and other obstacles liable to deform the tube, and it is possible to dig with the tube at a higher speed than was previously possible.

The design of the digging tip end is conventional, and any available tip can be used. In accordance with a preferred embodiment of the invention, the digging tool is a tube whose digging end is cut off at an angle of less than 45° and preferably less than 30° to the axis of the tube, producing a sharp tip with an opening of oval configuration and downwardly curved, as seen in the direction of travel of the tool while digging, with the long axis of the oval-shaped end being vertically directed and being from about 2.5 to about 6, preferably from 3 to 4, times longer than the short axis. This design of digging tool tip gives better digging in the presence of obstacles such as branches, stones, and similar solid objects. This increases digging speed, and in combination with a rapidly operating depth indicator, gives a high planting rate.

The sides of the plant delivery opening are preferably in the same plane and shaped to receive the closure means. The closure means can be a flat or curved plate movable between closing and open positions across and away from the opening. The closure means can be reciprocated, swung or pivoted between closing and open positions.

The present invention is particularly suitable for the hole-type and plowing-type planting devices having a digging tool arranged to be inserted into the ground along a straight or arcuate path to make a hole or to plow a furrow, said paths being directed obliquely downwards and forwards, in the direction of movement of the vehicle carrying the device. The discharge end of the digging tool is cut obliquely downwardly and forwardly in the direction of movement of the vehicle, in a plane which, during the whole of the insertion movement of the planting device or during the latter part of said movement, is inclined more steeply than the direction in which the digging tool is inserted into the ground. The tip of the digging tool is placed so that the leading side is solid tube, and the oval opening faces rearwardly.

The tension spring between the digging and planting device and the lifting arm for the return movement of the digging and planting tool can also be modified. It can, for example, be replaced with a hydraulic force accumulator for single or double operating control.

In the illustrated embodiment, the apparatus is provided with a plant hole making, digging and planting tool. However, the digging and planting tool can be replaced with a hollow planting plow of known construction, which is reciprocably arranged.

Having regard to the foregoing disclosure, the following is claimed as inventive and patentable embodiments thereof:

1. A digging and planting machine comprising, in combination, a vehicle, and, carried on the vehicle, a digging and planting tool including a tubular member movable between a lower position partially embedded in the ground and an upper position above the ground, and having an open digging and planting tip end, for digging a hole and conveying a plant to the hole; means for moving the tubular member between its lower and upper positions; at least two surface-detecting and signalling means arranged on two opposed sides of and adjacent to the tubular member, for sensing the surface of the ground on said opposed sides adjacent to the digging tip end of the tubular member and signalling a control means; said control means operatively connected to each surface-detecting means and said means for moving said tubular member, said means for moving said tubular member continuing digging movement of the tubular member until at least said two surface-detecting means have contacted the ground surface, thereby gauging the lay of the surface of the ground on opposed sides of the tubular member between the surface-detecting means to provide a hole of the desired depth according to the lay of the ground.

2. A digging and planting machine according to claim 1, in which the surface-detecting means are disposed laterally of and on opposed sides of the digging tip end of the tubular member.

3. A digging and planting machine according to claim 1, in which the surface-detecting means comprises reciprocable ground-contacting members resiliently biased towards a ground-contacting position, and switch actuator members operatively connected to the ground-contact members and movable therewith into and away from a position actuating a switch.

4. A digging and planting machine according to claim 3, in which the control means comprises a switch in an electric circuit including the control means and actuated by the switch actuator members when the ground-contact members are in ground-contacting position for controlling the digging and planting.

5. A digging and planting machine according to claim 1, in which the surface-detecting means are mounted for movement on the tubular member.

6. A digging and planting machine according to claim 1, which includes bias means biasing the surface-detecting means towards the ground.

7. A digging and planting machine according to claim 1, comprising a hydraulic cylinder which moves the tubular member between its lower and upper positions.

8. A digging and planting machine according to claim 1, in which the open digging and planting tip end of the tubular member comprises closure means movable between a first position closing off the open end for digging a hole, and a second position exposing the open end for delivery of a plant from the tubular member into the hole.

9. A digging and planting machine according to claim 1, in which the tubular member is a tube whose digging end is cut off at an angle of less than 45° to the axis of the tube, with a sharp tip having an opening of oval configuration and downwardly curved, as seen in the direction of travel of the tubular member while digging, with the long axis of the oval-shaped end being vertically directed and being from about 2.5 to about 6 times longer than the short axis.

10. A digging and planting machine according to claim 1, in which the tubular member is arranged to be inserted into the ground along a path directed obliquely downwards and forwards in the direction of movement of the vehicle carrying the device.

11. A digging and planting machine according to claim 1, in which the tubular member is a tube having a central passage through which plants can be fed to a hole dug by the tool, and the tip of the tubular member is placed so that the leading side is solid tube, and an oval opening faces rearwardly.

12. A digging and planting machine according to claim 1, in which the surface-detecting means are reciprocably mounted for movement between two limiting positions, and when in ground-contacting position are reciprocated into one limiting position and actuate a switch triggering an electric circuit to give a signal.

13. A digging and planting machine according to claim 12, which includes bias means biasing the surface-detecting means towards the ground.

14. A digging and planting machine according to claim 12, comprising a hydraulic cylinder which moves the tubular member between ground-elevated and ground-contacting positions.

15. A digging and planting machine according to claim 12, in which the tubular member is a tube whose digging end is cut off at an angle of less than 45° to the axis of the tube, with a sharp tip having an opening of oval configuration and downwardly curved, as seen in the direction of travel of the tubular member while digging, with the long axis of the oval-shaped end being vertically directed and being from about 2.5 to about 6 times longer than the short axis.

16. A digging and planting machine according to claim 12, in which the tubular member is arranged to be inserted into the ground along a path directed obliquely downwards and forwards in the direction of movement of the vehicle carrying the device.

17. A digging and planting machine according to claim 12, in which the tubular member is a tube having a central passage through which plants can be fed to a hole dug by the tool, and the tip of the tubular member is placed so that the leading side is solid tube, and an oval opening faces rearwardly.

* * * * *

UNITED STATES PATENT OFFICE
CERTIFICATE OF CORRECTION

Patent No. 4,069,774  Dated January 24, 1978

Inventor(s) Stig-Gunnar Lofgren et al.

It is certified that error appears in the above-identified patent and that said Letters Patent are hereby corrected as shown below:

Column 1, line 29, delete "moved", second occurrence.

Column 2, line 44, after "1975" insert -- now Patent No. 4,060,043 patented November 29, 1977 --.

Column 3, line 51, "if" should read -- as --.

Column 3, line 51, "is" should read -- will --.

Column 3, line 51, after "not" insert -- be --.

Column 8, line 59, delete "p" at end of line.

Signed and Sealed this

Nineteenth Day of September 1978

[SEAL]

Attest:

RUTH C. MASON
Attesting Officer

DONALD W. BANNER
Commissioner of Patents and Trademarks